Dec. 12, 1967   OSAMU NOMURA   3,358,186
DIMMER FOR ELECTRIC LAMPS
Filed Dec. 27, 1963   2 Sheets-Sheet 1

United States Patent Office 3,358,186
Patented Dec. 12, 1967

3,358,186
DIMMER FOR ELECTRIC LAMPS
Osamu Nomura, Kohoku-ku, Yokohama-shi, Japan, assignor to Tokyo Shibaura Electric Co., Ltd., Kawasaki-shi, Japan, a corporation of Japan
Filed Dec. 27, 1963, Ser. No. 333,934
Claims priority, application Japan, Dec. 30, 1962
37/81,114
2 Claims. (Cl. 315—194)

This invention relates to a dimmer for electric lamps and more particularly to a dimmer wherein one or more controlled rectifier elements are employed to control the intensity of illumination of the electric lamps.

In the dimmer of the type above described it is usual to control the phase angle of the control voltage impressed upon the control electrode of the controlled rectifier element to control the firing angle or the instant in the respective positive half cycle at which the rectifier element is rendered conductive. As a result of sudden conduction of the rectifier element the voltage of a source of alternating current generally drops momentarily owing to the internal voltage drop of the source. Where a number of such dimmers are connected in parallel with the same source of supply said voltage drop caused by the operation of one of the dimmers often disturbs the operation of the remaining dimmers. Thus, such sudden voltage drop will cause the controlled rectifier elements of the remaining dimmers to conduct or fire at an instant other than that is determined by the control voltage impressed upon their control elements.

Accordingly it is the object of this invention to eliminate such disturbance.

Another object of this invention is to operate independently a number of dimmers energized by a common source of supply.

In accordance with this invention the above and other objects are attained by providing a suitable filter in the control or gate signal generating circuit for said controlled rectifier element.

In one embodiment of this invention, an electric lamp load is energized from a source of alternating current through the input terminals of a bridge connected rectifier circuit and a silicon controlled rectifier element is connected across the output terminals of the rectifier circuit. Alternatively, a pair of oppositely poled silicon controlled rectifier elements may be connected across the input terminals of the rectifier circuit. In order to supply a gate signal of variable phase to the gate electrode of the silicon controlled rectifier element or elements there is provided a gate signal generating circuit including a unijunction transistor and a CR time constant circuit. A filter is connected to the gate signal generating circuit to eliminate the effect of sudden voltage drop in the supply voltage due to conduction of said silicon controlled rectifier element or elements.

The features of the invention which are believed to be novel are set forth with particularity in the appended claims. The invention itself, however, as to its organization together with further objects and advantages thereof, may best be understood by reference to the following description taken in connection with the accompanying drawings, in which;

Figure 1:
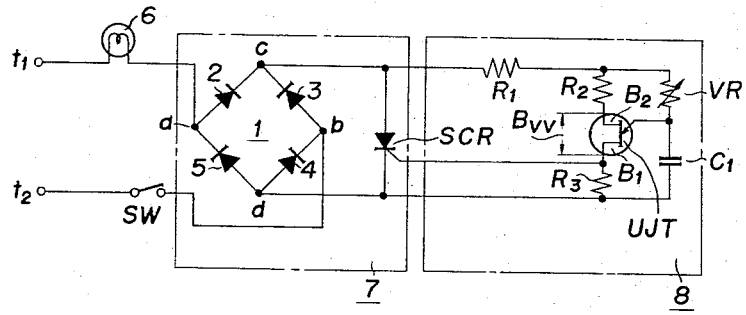
FIG. 1 shows the connection diagram of a prior art dimmer for electric lamps.

Referring now to FIG. 1 of the accompanying drawings there is shown a prior art dimmer for electric lamps wherein silicon controlled rectifier element (SCR) is used to control the intensity of illumination of the lamps by adjusting the firing angle of the rectifier element. As shown in the drawings, a bridge connected rectifier circuit 1 is provided comprising four half wave rectifier elements such as semiconductor diodes or copper oxide rectifiers and the like. One of the input terminals $a$ of the rectifier circuit is connected to one of the input terminals $t_1$ through a load comprising one or more electric lamps 6 and the other terminal $b$ of the rectifier circuit is connected to the other input terminal $t_2$ via a suitable switch SW.

Across the output terminals $c$ and $d$ of the rectifier circuit 1 is connected a suitable controlled rectifier such as a grid controlled vapor discharge tube or a silicon controlled rectifier element SCR to constitute a firing angle control circuit 7. The anode electrodes of the rectifier element SCR is connected to one of the base electrodes $B_2$ of a unijunction transistor UJT through serially connected resistors $R_1$ and $R_2$ while the cathode electrode of the rectifier element is connected to the other base electrode $B_1$ of the unijunction transistor through a resistor $R_3$. Further, the gate electrode of the rectifier element SCR is directly connected to said other base electrode $B_1$. A CR time constant circuit including serially connected variable resistor VR and condenser $C_1$ is connected between the common junction between resistors $R_1$ and $R_2$ and the cathode electrode of the SCR element, while the common junction between the variable resistor VR and the condenser $C_1$ is connected to the emitter electrode E of the unijunction transistor UJT to form a gate signal generating circuit 8.

In the operation of the dimmer constructed as above described, upon closure of the switch SW, the condenser $C_1$ will be charged through resistor $R_1$ and VR by the output voltage of the rectifier circuit 1. When the condenser $C_1$ is charged up to a predetermined voltage the unijunction transistor UJT will become conductive to generate a pulse signal across the resistor $R_3$. This pulse signal is then impressed upon the gate electrode of the SCR element to render it conductive from the instant of application of said pulse signal to light the lamp load 6. As will be clear to those skilled in the art, the phase of said pulse is determined by the time constant of the CR circuit comprising the variable resistor VR and the condenser $C_1$, so that by varying the variable resistor VR, the firing angle of the silicon controlled rectifier element SCR, and hence the intensity of illumination of the lamp load can be varied.

When utilizing firing angle control in such a dimmer, when the rectifier element SCR is rendered conductive, the load current will flow suddenly so that there will be a sudden drop in the source voltage due to the internal impedance of the source.

These phenomena are inevitable unless the internal impedance of the source is reduced to a very small value, and affects other similar dimmers connected to the same source, in the following manner. More particularly, if a voltage wave including a depression caused by the firing of a silicon controlled rectifier element of the second dimmer is impressed across the anode and cathode electrodes of the controlled rectifier element of the first dimmer, the voltage impressed across the first and second base electrodes $B_1$ and $B_2$ of the unijunction transformer UJT included in the gate signal generating circuit 8 will also be depressed momentarily because these base electrodes are connected across the output terminals of the controlled rectifier element SCR as above described. Accordingly if the firing angle or phase angle of the second dimmer were close to that of the first dimmer, the unijunction transistor UJT would generate a gate signal at the instant when said voltage depression is produced. Thus, when the second dimmer is adjusted to become conductive at an earlier point than the first dimmer, the silicon controlled rectifier element SCR of the first dimmer will be forced to become conductive at an earlier point than the predetermined time, or simultaneously with the firing of the second dimmer.

Figure 2:
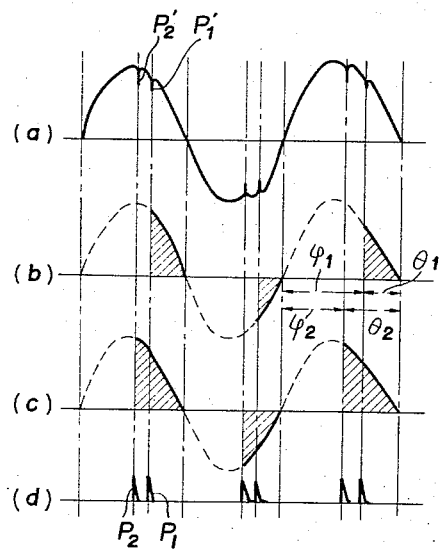
FIG. 2 shows wave forms at various portions of the dimmer shown in FIG. 1 to explain the operation thereof.

This can be more clearly understood by referring to FIG. 2. The pulses $P_1$ and $P_2$, as shown in FIG. 2d are the gate signals of the first and second dimmers, respectively. In other words, the first pulse $P_1$ serves to fire the first dimmer at an firing angle $\psi_1$ for a conduction period $\theta_1$, and the second pulse $P_2$ serves to fire the second dimmer at an firing angle $\psi_2$ for a conduction period $\theta_2$, as shown by the curves $b$ and $c$ of FIG. 2. At the instant of such firing the voltage wave $a$ of the source will be depressed momentarily as shown at $P_1'$ and $P_2'$. As has been pointed out hereinabove, the voltage depression $P_2'$ caused by the conduction of the second dimmer will render the first dimmer to conduct at an earlier firing angle $\psi_2$ rather than at $\psi_1$.

In this manner in conventional dimmers it was inevitable to accompany the so-called "draw phenomena" wherein adjustment of the first dimmer by means of its variable resistor VR results in the variation in the intensity of the illumination of the second dimmer.

It is therefore the principal object of this invention to eliminate the above mentioned draw back, or the draw phenomena. According to this invention in order to attain this object a suitable filter including a condenser is included in parallel with the unijunction transistor of the gate signal generating circuit.

Figure 3:
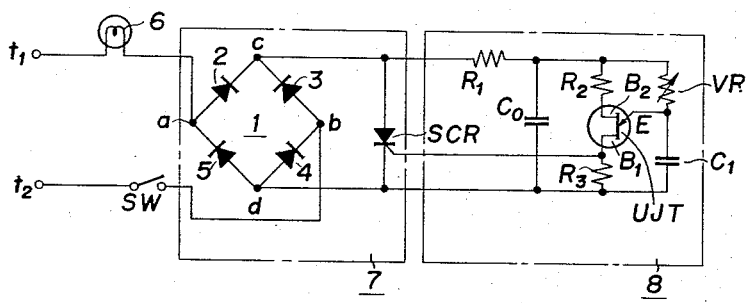
FIG. 3 shows the connection diagram of one embodiment of this invention.

FIG. 3 illustrates the connection diagram of one embodiment of this invention. The dimmer shown in FIG. 3 is substantially the same as that shown in FIG. 1 except that a condenser Co is added between the common junction of resistors $R_1$ and $R_2$ and the cathode electrode of the silicon controlled rectifier element SCR. Corresponding components of FIGS. 1 and 3 are designated by the same reference characters.

As a result of modifications of the gate signal generating circuit by the addition of the condenser Co, the dimmer of this invention operates as follows: Like the first embodiment when input terminals $t_1$ and $t_2$ are energized by an A-C voltage the gate signal generating circuit 8 will generate a gate signal to fire the silicon controlled rectifier element SCR at an instant determined by the time constant of the resistor VR and the condenser Co. As above described at the moment of firing the silicon controlled rectifier element the voltage wave will be depressed momentarily to result in the draw phenomena of other dimmers connected to the same source of supply. However the condenser Co provided in accordance with this invention cooperates with the resistor $R_1$ to form a filter which eliminates the effect of said depression in the voltage wave. Therefore the voltage V across the base electrodes $B_1$ and $B_2$ of the unijunction transistor UJT will not be affected to any appreciable extent by said voltage depression so that the silicon controlled rectifier element SCR will be fired at the predetermined instant determined by the time constant of the variable resistor VR and the condenser $C_1$, thus obviating the undesirable phenomena of draw. In this way the respective dimmers are assured to operate independently to accurately control their associated electric lamps.

Figure 4:
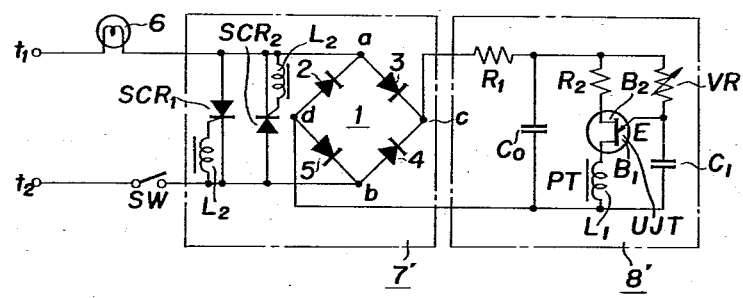
FIGS. 4 and 5 show the connection diagrams of other embodiments of this invention.

In the modification shown in FIG. 4, a pair of opposite poled silicon controlled rectifier elements $SCR_1$ and $SCR_2$ are connected across the input terminals $a$ and $b$ of the bridge connected rectifier circuit 1 to form a firing angle control device 7'. Across the output terminals $c$ and $d$ of the rectifier circuit 1 is connected a gate signal generating circuit 8' for said rectifier elements $SCR_1$ and $SCR_2$ including a unijunction transistor UJT. The output of the gate signal generating circuit is derived out through a pulse transformer PT having a primary winding $L_1$ connected between one of the base electrodes $B_1$ of the unijunction transistor UJT and one of the output terminals $c$ of the rectifier circuit 1 and secondary windings $L_1$ and $L_2$, each connected between the gate electrode and the cathode electrode of said silicon controlled rectifier elements $SCR_1$ and $SCR_2$, respectively. Thus the firing angle of the silicon controlled rectifier elements are controlled to vary the current flowing through the electric lamp. Again, a condenser Co is included to eliminate the effect of draw phenomena. Other components are designated by the same reference characters as in FIG. 3 and operate similarly.

Figure 5:
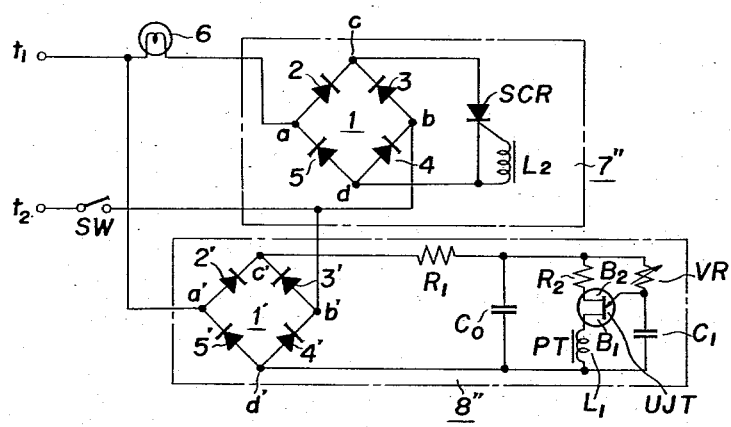

FIG. 5 shows a still further modification of this invention wherein a gate signal generating circuit 8'' is separated from the circuit of the lamp load 6. Thus, the gate signal generating circuit 8'' is directly connected to the input terminals $t_1$ and $t_2$ through an additional bridge connected rectifier circuit 1' and the output pulse of the gate signal generating circuit 8'' is applied to the gate electrode of a silicon controlled rectifier element SCR directly connected across the output terminals $c$ and $d$ of the first rectifier circuit 1 through a pulse transformer PT having a primary winding $L_1$ connected between one of the base electrodes $B_1$ of the unijunction transistor UJT and one of the output terminals $d'$ of the additional rectifier circuit 1' and a secondary winding $L_2$ connected between the gate electrode and the cathode electrode of the silicon controlled rectifier element SCR. Corresponding components of FIGS. 3 and 5 are designated by the same reference characters. Again a condenser Co is connected in parallel with the unijunction transistor UJT to attain the same object.

While in all of the above described embodiments the condenser Co has been shown to be connected in parallel with the base circuit of the unijunction transistor UJT, it will be understood that the same effect can be expected by connecting the condenser Co directly between two base electrodes $B_1$ and $B_2$ or between the base electrode $B_2$ and one of the output terminals $d$ or $d'$ of the bridge rectifier.

From the above description it will be clear that according to this invention a condenser is associated with a unijunction transistor included in a gate signal generating circuit for controlling a silicon controlled rectifier element of a dimmer whereby to form a filter circuit which can eliminate miss operation of another dimmer connected to the same source of supply.

In accordance with the provisions of the patent statutes, I have explained the principle and operation of my invention and I have illustrated and described what I consider to represent the best embodiment thereof. However I deside to have it understood that within the scope of the appended claims, the invention may be practiced otherwise than as specifically illustrated and described.

What is claimed is:

1. A dimmer for an electric lamp comprising a source of alternating current, a rectifier circuit, a lamp load connected between said source of alternating current and said rectifier circuit, a pair of opposite poled silicon controlled rectifier elements connected across the input terminals of said rectifier elements, a gate signal generating circuit including a unijunction transistor connected across the output terminals of said rectifier circuit for controlling the conduction of said silicon controlled rectifier elements and a filter circuit including a resistor and a condenser, said filter being connected between the output terminals of said rectifier circuit and said unijunction transistor.

2. A dimmer for electric lamps comprising a source of alternating current, a lamp load, a bridge connected rectifier circuit connected to said source of alternating current through said lamp load, a silicon controlled rectifier element connected across the output terminals of said rectifier circuit, a second bridge connected rectifier circuit energized from said source of alternating current, a gate signal generating circuit including a unijunction transistor connected across the output terminal of said second rectifier circuit for controlling the conduction of said silicon controlled rectifier element and a filter circuit including a resistor and a condenser, said filter being connected between the output terminals of said second rectifier circuit and said unijunction transistor.

References Cited
UNITED STATES PATENTS 2,961,579    11/1960    Roney et al. _____ 315—100
3,130,347    4/1964    Harpley _____ 315—199 X

OTHER REFERENCES

Gutzwiler, F. W.: Rectifier Voltage Transients. Appearing in "Application Note," Rectifier Components Dept. General Electric, 200.11, formerly ECG-544, July 1961.

JOHN W. HUCKERT, *Primary Examiner.*

D. O. KRAFT, *Assistant Examiner.*